…

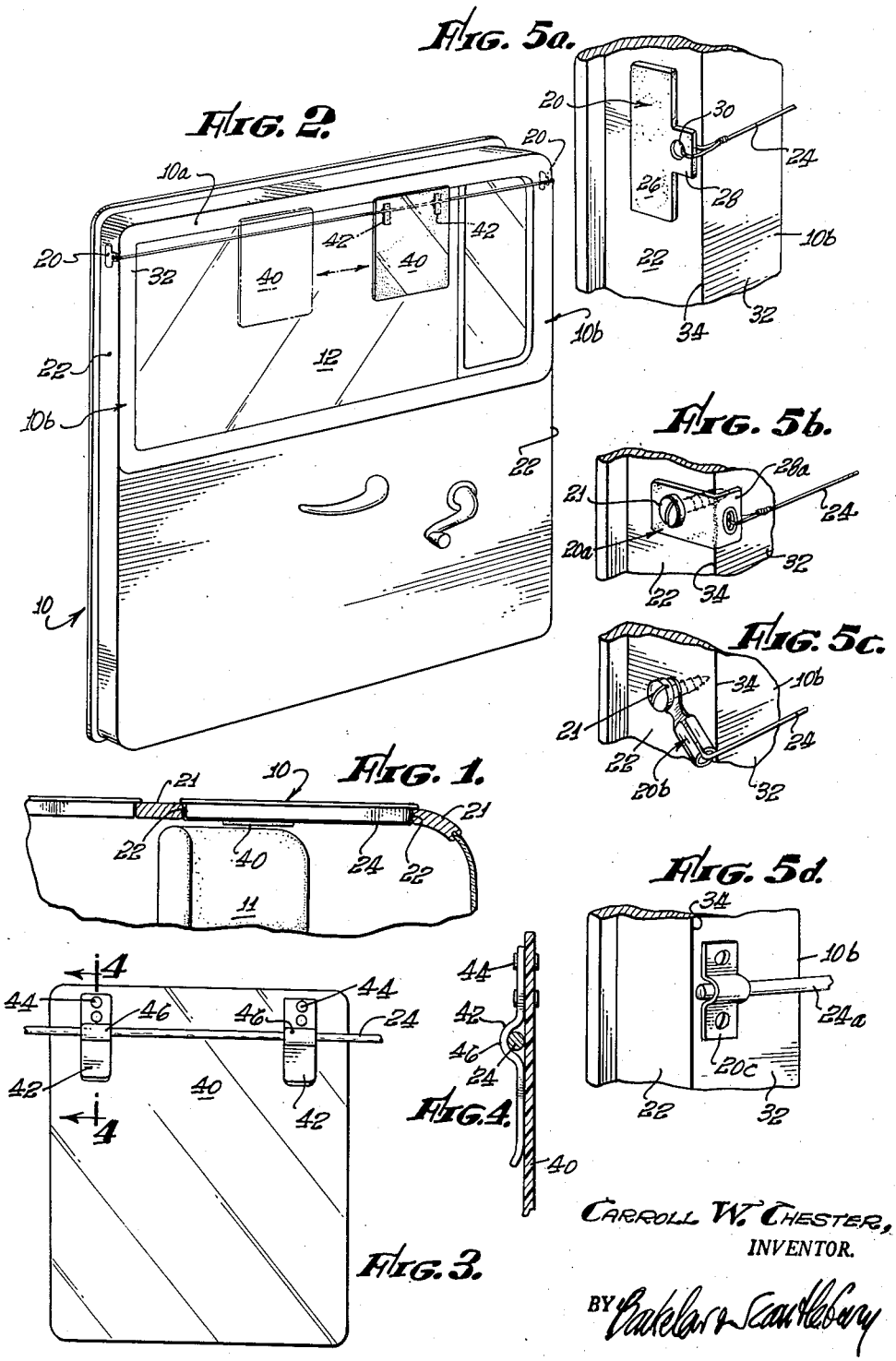

United States Patent Office 2,831,725
Patented Apr. 22, 1958

2,831,725

SUN SHIELD FOR AUTOMOBILES

Carroll W. Chester, Los Angeles, Calif.

Application May 10, 1956, Serial No. 584,106

2 Claims. (Cl. 296—97)

This invention relates to shields adapted to protect an occupant, for example the driver, of an automobile from the glare and direct heat of the sun's radiation, particularly when the sun is low and shining into the vehicle from the side. Automobiles are commonly equipped with shields which may be swung from a position in front of the occupant to a position at the side; but in their use at the side they are inadequate, because of size or position, to effectively protect an occupant's or driver's face from direct sun radiation except in particular and limited relative orientations of the sun.

It is a general object of the present invention to provide a simple, inexpensive and easily mounted shield capable of giving fully effective protection from sun radiation in all relative orientations at the side, and which will not obstruct the driver's view.

The invention, and its achievement of this objective, will be best understood from the following description of preferred forms, and the accompanying illustrative drawings in which:

Fig. 1 is a schematic fragmentary plan-section indicating the application of my invention to the left front door of an automobile;

Fig. 2 is a perspective illustrating the application of one illustrative form of the invention to the side door of an automobile;

Fig. 3 is an elevation of the shield and a fragmentary part of the carrier on which the shield is adjustable;

Fig. 4 is an enlarged section on line 4—4 of Fig. 3;

Fig. 5a is a perspective enlargement of a part of Fig. 1, showing one form of mounting member applied to the door; and Figs. 5b, 5c, and 5d are similar perspectives showing illustrative modifications of the mounting member.

In the drawings 10 designates a typical side door of an automobile, which may be illustrative of any side glass framing or any side glassed door of the automobile body, but for purposes of simple description here will be assumed, without limitation thereto, to be the glassed door at the left of the driver's seat 11. As shown, the door 10 forms in its upper part a frame, with upper stile 10a and side members 10b, for the glass panel 12. In present day automobile designs the upper edge of the glass is well above the usual driver's head and face allowing direct sun radiation to strike the head and face when the sun, at the left, is even as much as some hours above the horizon.

As shown in Fig. 2, I attach two mounting members 20 to the opposite side edges 22 of the door frame near its top, and between those two members I run a shield carrier 24. If the upper edge of the door frame is horizontal, then carrier 24 is also horizontal or substantially so. In any case the carrier is preferably mounted at an elevation at or fairly close to the upper edge of the glass panel 12, and its extent is preferably substantially parallel to the upper edge of that panel and to the upper stile of the door frame.

The simple mounting member 20 shown in Figs. 2 and 5a has a body 26 which may be secured to the the door edge 22 in any suitable or convenient manner, for example by cementing. Projecting from one edge of that body is a projection 28 having a perforation 30. The projection and its perforation may or may not project inwardly beyond the inner face 32 of the side member 10a of the door frame. It is shown in these figures as not so projecting, and the carrier 24, preferably flexible, is stretched between the two members, bends around the frame corners 34 and lies directly against the inner frame faces 32. Mounting members 20 are preferably of stamped flexible plastic or fabric thin enough to be freely accommodated in the usual clearance between the door edges 22 and the body framing 21 which forms the doorway.

Preferably the carrier 24 may be a flexible wire, cord or small cable. Any such flexible member is easily attached at one end to one perforated mounting member, stretched taught through the other perforated member, and then looped and then twisted or bound upon itself as indicated in Fig. 5a. The carrier securings at both ends may be as shown in that figure, or any other convenient securings.

The shield piece 40 is mounted to depend from carrier 24 and to be adjustably movable along the length of the carrier. Any slidable mounting may be used; typically a pair of spring clips 42, riveted at 44 to the shield with loop formation 46 encompassing the carrier and pressing it frictionally against the shield. The frictional engagement holds the shield in any adjusted position along the length of the carrier.

The upper edge of the shield preferably projects above the carrier so as to be above the upper edge of the glass panel to prevent sun radiation coming in over the shield. The upper edge of the shield, above the glass panel, bears against upper stile 10a as shown in Fig. 2. The horizontal width of the shield is preferably somewhat greater than the maximum horizontal dimension of a face viewed in profile; say about five inches. The height dimension of the shield is such that its lower edge is about level with the driver's neck. Considering present day automobile design and the variations in human stature, a height dimension of about six inches suffices to shield the face and neck from the sun when it is on or near the horizon.

The material of the shield is preferably a clear transparent thin plastic sheet dyed or colored with a transparent pigment to a neutral shade to absorb a portion of the sun's radiation, and particularly the heat radiation. With such a transparent shield material the person's view through it is clear, being only partially darkened and not obstructed; and the shield, occupying only a fraction of the window area opposite the eyes leaves the remainder of the view perfectly clear. Thus, by moving the shield along the carrier to keep it between the face and the sun, the face is completely protected and the field of vision is not obscured.

Other typical variant mountings for the carrier are shown in Figs. 5b, 5c and 5d. In Fig. 5b the mounting member 20a is secured to the edge surface 22 by a screw 21, and its perforated part 28a is shown as bent around corner 34 so that it and the carrier 24 lie closely against inner frame face 32. Fig. 5c shows clip 20b secured by screw 21 and holding the end of carrier 24 by being compressed around it. Such a clip can be attached at an angle, such as indicated in Fig. 5c, so as not to project beyond corner 34, and so the carrier 24 can lie against inner face 32.

In the figures so far described carrier 24 is preferably flexible or semi-flexible and is stretched taut. On the other hand it may be relatively stiff, in the form of a small rod or wire. Fig. 5d shows a small rod 24a mounted in a clip 20c secured to the inner face 32 of the door frame.

Other preferable features of the shield add to its utility and efficiency. It has been mentioned that the upper edge of the shield, projecting above carrier 24, has its upper edge at least as high as the framed opening. Its upper edge also preferably projects above the lower edge of upper frame stile 10a so as to contact the stile to keep the lower dependent part of the shield from swinging inwardly. This is particularly effective in keeping the shield, which is carried on the carrier at a level below the stile, from being blown inwardly when the glass panel is opened by being moved down from the stile.

When not in use, the shield can easily be detached from the carrier and stowed in the glove compartment. Or, it can be moved to the rear edge overhanging the rear frame member 10b, where it is out of the driver's line of sight. Likewise it can be moved to extreme forward position with its forward edge overhanging the forward frame member 10b. The spacing of clips 42 from the side edges of the shield piece facilitate these overhanging positions. And the overhang in the forward position completely assures that no sun radiation can come through onto the driver's face at the forward edge of the framed opening.

I claim:

1. In combination with a vehicle structure having a frame which frames a side opening with an upper stile framing a glass panel; an elongate carrier mounted at its ends on the sides of the opening frame and extending substantially horizontally across the inner face of the framed opening at a distance below the top of that opening, a rigid sheet-like shield piece of lesser width than the opening dependently mounted on the carrier and slidable along the length of the carrier to various positions in the opening, the shield piece extending above the carrier and bearing against the inner face of the upper stile, and the shield piece extending below the carrier a distance greater than its extent above the carrier.

2. The combination defined in claim 1, and including two carrier mounting members mounted on the sides of the opening frame, and in which the carrier is a flexible member stretched taut between said mounting members.

References Cited in the file of this patent

UNITED STATES PATENTS

| | | |
|---|---|---|
| 1,813,556 | Young | July 7, 1931 |
| 1,969,887 | Flanary | Aug. 14, 1934 |
| 2,212,007 | Buchanan | Aug. 20, 1940 |

FOREIGN PATENTS

| | | |
|---|---|---|
| 634,997 | France | Dec. 10, 1927 |
| 342,357 | Italy | July 30, 1936 |